United States Patent [19]

Graham et al.

[11] Patent Number: 4,982,083

[45] Date of Patent: Jan. 1, 1991

[54] OPTICAL SIMULATOR WITH LOOP-BACK ATTENUATOR AND FILTER

[75] Inventors: Bruce M. Graham; Susan J. Lathan, both of Hummelstown, Pa.

[73] Assignee: AMP Incorporated, Harrisburg, Pa.

[21] Appl. No.: 460,434

[22] Filed: Jan. 3, 1990

[51] Int. Cl.$^5$ .......................... H01J 5/16; H01J 40/14; G01N 21/00
[52] U.S. Cl. .............................. 250/227.11; 350/96.2; 356/73.1
[58] Field of Search .................... 250/227.11, 239, 551; 350/96.15, 96.2, 96.22; 356/73.1

[56] References Cited

U.S. PATENT DOCUMENTS

| | | | |
|---|---|---|---|
| 3,628,039 | 12/1971 | Ochs | 250/551 |
| 3,999,837 | 12/1976 | Bowen et al. | 350/96.22 |
| 4,081,258 | 3/1978 | Goell et al. | 356/73.1 |
| 4,261,640 | 4/1979 | Stankos et al. | 350/96.15 |
| 4,702,549 | 8/1984 | Duck et al. | 350/96.15 |
| 4,708,422 | 11/1987 | Hanoux et al. | 356/73.1 |
| 4,736,100 | 4/1988 | Vastagh | 250/227 |

OTHER PUBLICATIONS

Macleod, Thin-Film Optical Filters, McMillian Publishing Co, New York 1986, pp. 164–165 & 155–157.
"Schott Filter Glass Catalog," Number 3566E/U.S.A. iii/87/o.P/Printed in West Germany, Schott Glass Technologies Inc. 1987.

Primary Examiner—David C. Nelms
Assistant Examiner—Stephone B. Allen

[57] ABSTRACT

An optical simulator 10, shaped to be interchangeable with a complementary connector 7 that intermates with an optical connector 6 having an optical emitter 4 and an optical detector 5, comprises an alignment fixture 12 with connectors 21 and 22 for intermating with the optical emitter 4 and the optical detector 5, and an optical fiber 11 formed in a loop and installed within the alignment fixture 12 with a first end face 39 of the loop 11 aligned through a corresponding alignment fixture connector 24, with the emitter 4 and a second end face 37 of the loop 11 aligned through a corresponding alignment fixture 25, with the detector 5 of the optical connector 6. The optical fiber 11 is formed in a loop further having an optical filter 43 attached to an end face 37 to provide controlled attenuation of optical power to the detector 5.

15 Claims, 4 Drawing Sheets

OPTICAL SIMULATOR WITH LOOP-BACK ATTENUATOR AND FILTER

FIELD OF THE INVENTION

The invention relates to testing optical equipment such as a transceiver prior to installation in an optical communications system and particularly to a simulator for testing such optical equipment.

BACKGROUND OF THE INVENTION

Optical communications systems utilize optical carrier waves to transmit communications signals among various items of optical equipment that are coupled into the systems and that use the systems to communicate with one another. The systems utilize optical fiber cables for transmitting the carrier waves from one item of optical equipment to another. For example, an optical communications system may comprise a computer central processing unit, CPU, as one item of equipment, a workstation, a peripheral, such as a printer, and optical fiber cables linked among the CPU, the workstation and printer.

Each item of optical equipment is coupled to the system by means of an optical connector that is constructed for disconnect coupling with the optical fiber cables. A duplex communications system utilizes two optical cables, one for receiving optical signals from an item of optical equipment, and another for sending signals. Each item of optical equipment has an optical emitter for sending the signals and a detector for receiving the signals. Optical connector provide disconnect coupling for both the optical emitter and the optical detector.

Testing of such items of optical equipment is a necessity to assure proper design. In testing, the environment must accurately simulate the anticipated environment of operation which includes attenuation which comes about through loss of photons by the light signal during transit, thus reducing amplitude.

Fiber attenuation may arise from two sources; absorption and scattering. Impurities in glass absorb light energy, turning photons into heat. Some impurities remain as residue in the glass fiber after purification and processing; others are dopants added purposely to obtain certain optical properties. Scattering results from imperfections in the fibers and from the basic structure of the fiber. Rayleigh scattering comes from the atomic and molecular structure of the glass, and from density and composition variations that are natural by-products of manufacturing. Unintentional variations in density and fiber geometry occur during fiber manufacture and cabling. Small variations in the core diameter, microbends, and small incongruities in the core-to-cladding interface cause loss.

Attenuation for fiber is specified in decibels per kilometer (dB/km). For commercially available fibers, attenuation ranges from about one dB/km for premium small core glass fibers, to over 2000 dB/km for large core plastic fibers.

Some installed systems involve several miles of optical fibers. Hence, and typically, testing is done by simulation whereby the emitter and detector of the item of optical equipment to be tested are connected to a device that simulates the optical system, and the operation of the item is tested as though the item were coupled into the system itself and not the testing device.

First simulators were devices capable of generating special test signals. Testing was performed externally on the item of equipment being tested. However, as items of optical equipment became increasingly complex, the need for testing has become greater. Further, with the development of more sophisticated capabilities, optical equipment has been designed with internal testing capabilities permitting self-testing. With self-testing, the expense of specialized testing equipment and associated testing procedures has been substantially reduced. In place of long lengths of cabling to simulate actual operations, and in place of simulators that are devices that produce complex signals or measurements, are simplified simulators having internal attenuating mechanisms.

The present invention relates to such simulators and in the form of loop-back attenuators. Loop-back attenuators are defined as simulators providing a communication signal path that forms a loop from the emitter to a detector of the same item of optical equipment such that optical signals transmitted from the item under test are looped back to the same item and internally transmitted among its component parts. Simulators which are loop-back attenuators that purposely simulate a loss of signal intensity expected of a communications system in which the item may be installed for "on-line" operation. Vastagh, U.S. Pat. No. 4,736,100, discloses a known loop-back simulator involving an optical fiber cable formed in a loop and having ends of the fiber connected with alignment ferrules. The loop is installed in an alignment fixture that aligns the ends of the loop with the emitter and detector of the item to be tested.

This known loop-back attenuator suffers from disadvantages. Firstly, it is difficult to provide, within short loop-back cable structure of the simulator, an attenuation of that of the much larger optical system that the optical item, such as a transceiver, will be attached to during actual operation. Another problem is one of magnitude in that too much undiminished optical power may saturate the detector of the transceiver. Another problem is accurately duplicating the amount of attenuation in the operations system so that the testing device creates an environment approximating the operation of the actual system for meaningful test results.

Objects of the present invention include providing a simulator in the nature of a loop-back attenuator that, in a compact device, is capable of reproducing the total attenuation of a substantially larger cable network. Other objects include providing a device capable of sufficiently attenuating optical power between emitter and detector of a transceiver or the like, to prevent saturation of the detector, and providing a device which easily and accurately may be controllably altered to match the particular amount of attenuation desired to simulate actual environmental operating conditions or to meet manufacturer's standards.

Another problem is that devices of different manufacturers, and even, indeed, the same device of the same manufacturer, have emitters that put out differing optical power. An objective in this respect, is to provide a device which may easily be altered to approximate the differing optical power outputs of devices and the attenuation characteristics to be expected in the operating systems. Hence another objective of the present invention is providing an optical simulator which is a loop-back attenuator usable on a variety of combinations of emitter and detector elements of a transceiver, which will approximate operating environments and which will effectively reduce power output so that the detector will not be saturated.

SUMMARY OF THE INVENTION

The invention resides in a simulator in the form of a loop-back attenuator that is constructed for disconnect coupling to an optical connector to, for example, a transceiver, for duplex optical communications. According to the invention, an optical fiber is utilized in loop-back form, and controlled attenuation is provided to the system by utilization of an optical filter in the form of a selective optical disc.

A filter is an optical element that partially absorbs incident electromagnetic radiation in the visible, ultraviolet, or infra red spectra, consisting of a pane of glass or other partially transparent material. In general, a filter is a selective device that transmits a desired range of energy, while substantially attenuating all other ranges.

Duck, et al, U.S. Pat. No. 4,702,546 discloses a variable optical attenuator used with an on-line fiber optic system including a printed circuit board. Attenuation is provided by a thin optical filter element which is mounted on a reciprocating means for selectively positioning the element between the fiber ends and along the transverse axis of the fibers. Stankos, et al, U.S. Pat. No. 4,261,640 relates to testing systems using in-line fiber optic lengths. This system includes a device for holding a first and second optic fiber with a filter disk therebetween to provide attenuation. The degree of attenuation provided is set to correspond to the attenuation of the length to be simulated minus the combined attenuation of the first and second optic fibers. The object of the Stankos, et al invention is to equalize the attenuation of one length of optic fiber in regard to another parallel length of optic fiber having a greater attenuation.

Differing is an optical filter utilized with a simulator in the form of a loop-back attenuator involving further considerations of providing attenuation in a much shorter length of optical fiber, and avoiding the problems of saturation, and achieving the objective of simulating a system of emitter and detector signals.

The optical simulator of the present invention is a loop-back attenuator shaped to be interchangeable with a complementary connector that intermates with an optical connector having an optical emitter and an optical detector, the optical simulator comprising an alignment fixture with connectors for intermating with the optical emitter and the optical detector, and an optical fiber formed in a loop and installed within the alignment fixture with a first end face of the loop aligned, through a corresponding alignment fixture connector, with the emitter, and a second end face of the loop aligned, through a corresponding alignment fixture, with the detector of the optical connector. The optical fiber is formed in a loop having an optical filter attached to an end face of the fiber at the detector side to provide controlled attenuation of optical power to the optical detector of the optical connector. A further aspect of the invention resides in a plug compatible shape for a loop-back attenuator specifically for disconnect coupling to an existent optical connector.

The particular filter, in an application, is determined by the required internal transmission of the filter according to the following:

$$T_i = (10^{(-LOSS/10)})/R_c$$

where $T_i$ is the internal transmission, $R_c$ is the reflection coefficient of the filter, and LOSS is the target loss in dBs. The thickness of the filter may be determined from the internal transmission by reference to standard transmission curves.

DESCRIPTION OF THE DRAWINGS

Referring to FIG. 1, is shown a portion of a printed circuit board 1 of a type found internally of a transceiver, not shown, that has an optical transmitter 2 and an optical receiver 3. In reference to FIG. 3, an optical emitter 4 of the transmitter 2 and an optical detector 5 of the optical receiver 3 are adjacent each other and are received by a transceiver adapter assembly 6 that is mounted on the circuit board 1 and that is constructed for disconnect coupling with a complementary connector 7 provided with optical fiber cables 8 and 9 that are part of a duplex communications system, not shown, to which the transmitter 2 and receiver 3 are coupled for optical communications with other items of the system.

Figure 1:
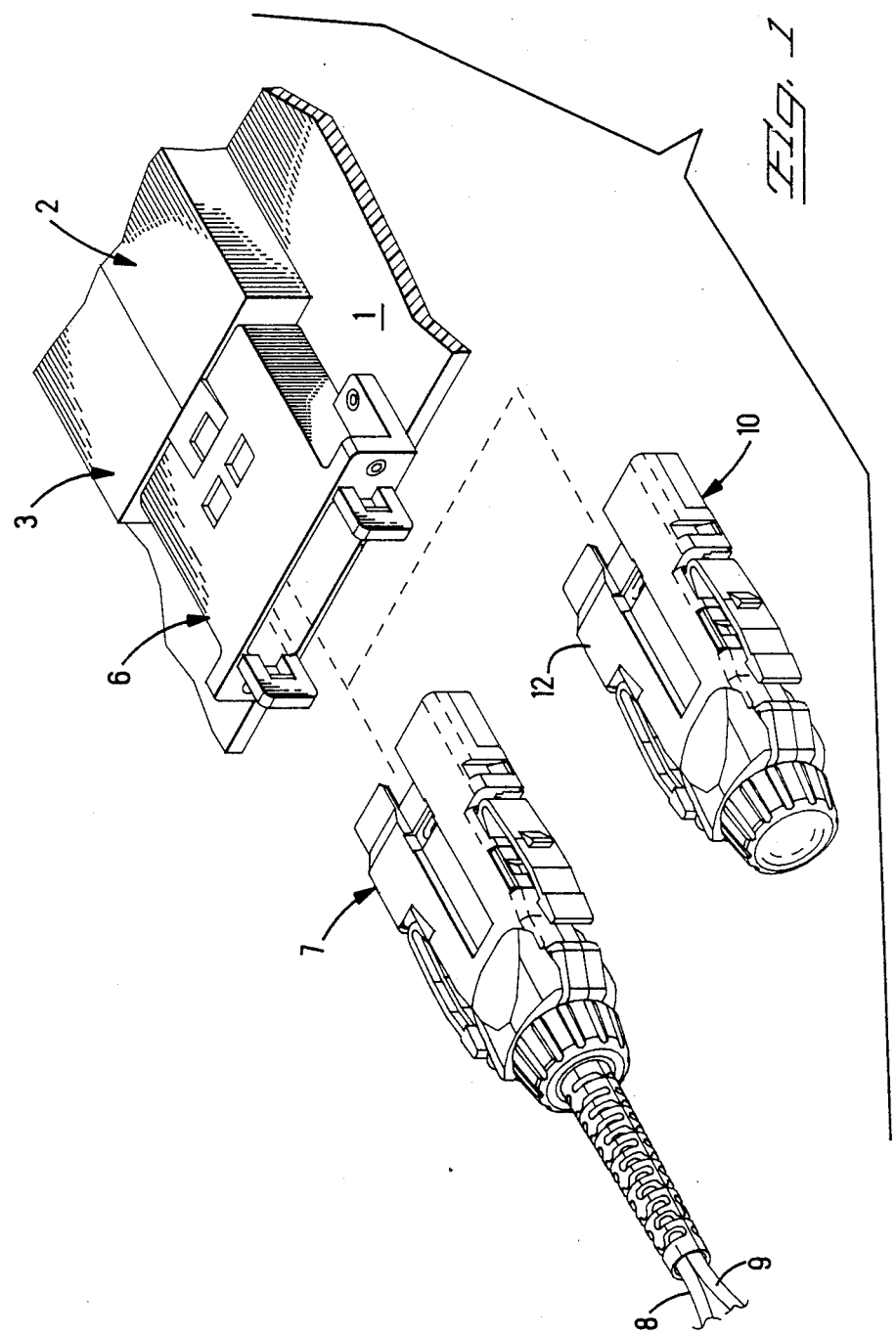
FIG. 1 is a perspective view of the optical simulator adapated for disconnect connection, in place of a known complementary connector for optical fiber cable, with an optical connector mounted on a circuit board together with an optical detector and an optical emitter.
Figure 2:
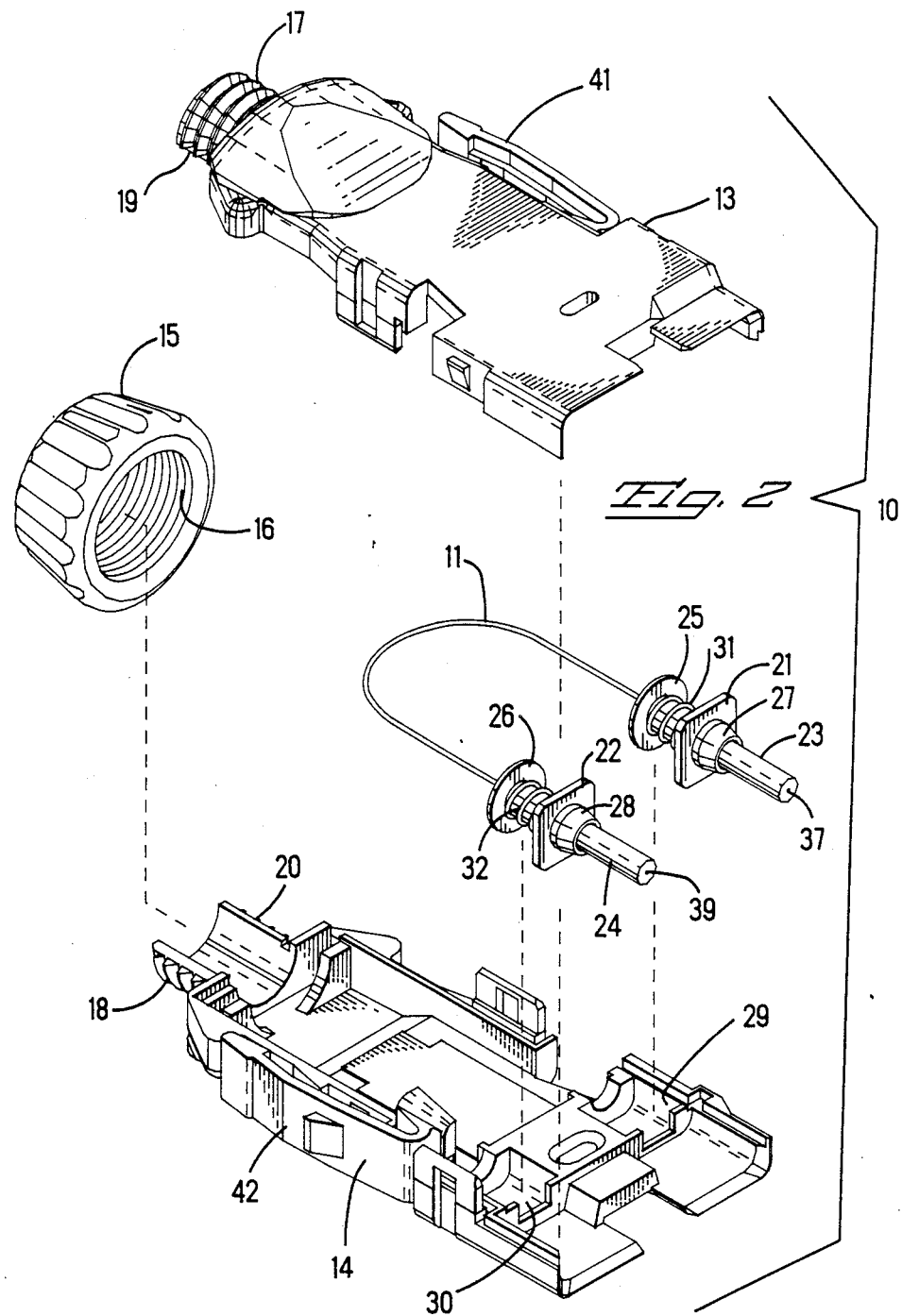
FIG. 2 is a fragmented perspective view with parts exploded, of the loop-back attenuator of the present invention.
Figure 3:
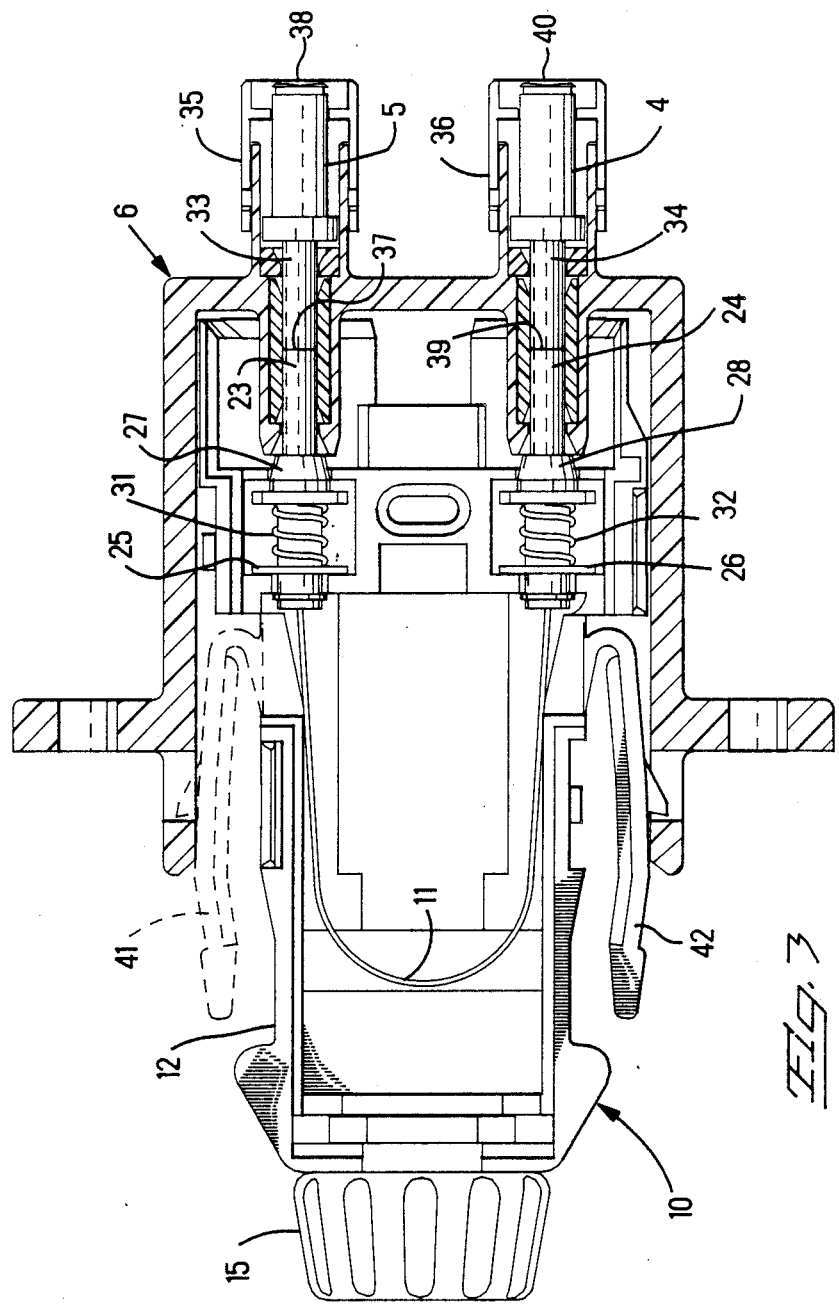
FIG. 3 is a front sectional view of the loop-back attenuator engaged with the optical connector mounted on a circuit board.

A simulator 10, in the form of a loop-back attenuator, is shown in FIGS. 1, 2 and 3 and is constructed for disconnect coupling with the connector 6. Simulator 10 simulates the optical attenuation of the system to which the transmitter 2 and receiver 3 are coupled for duplex communication. Attenuator 10 provides a loop-back optical path with optical fiber 11 that receives the optical emission from emitter 4 and transmits the optical emission along the loop-back path 11 to the detector 5 for use in testing the operation of the transceiver in which the transmitter 2 and receiver 3 are incorporated. The attenuator 10 comprises an alignment fixture 12 which is a hollow body of molded upper cover 13 and molded lower cover 14. The covers 13 and 14 are of insulated plastic material formed by molding into a shape that has an exterior with dimensions that intermate with the optical connector 6 to thereby serve as a substitute for the connector 7 associated with the optical fiber cables 8 and 9. Both the upper cover 13 and the lower cover 14 are complementarily contoured in their interiors so as to form cavities shaped to securely encompass and hold in place loop-back optical fiber 11 as is hereinafter described.

Referring to FIGS. 2, 3, 4A and 4B, upper cover 13 of alignment fixture 12 intermates with lower cover 14 by snap-in connection. Attenuator 10 is shown with threaded cap 15 with inward threads 16 for fit with the outward directed threads 17 and 18 of extension sections 19 and 20 to secure upper cover 13 together with lower cover 14 to encompass and provide an enclosure for optical fiber 11. At the ends of optical fiber 11 are fiber connectors 21 and 22 with alignment ferrules 23 and 24. Rear flanges 25 and 26 and truncated, cone-shaped, lead-in sections 27 and 28 are formed so as to nestle within complementary cavities formed at 29 and 30 by the closure of upper cover 13 and lower cover 14. Springs 31 and 32 bias the lead-in sections 27 and 28 to form secure fits within cavities 29 and 30.

Shown in FIG. 3, is optical fiber 11 enclosed within alignment fixture 12 and alignment fixture 12 engaged, in place of the complementary connector 7, with a connector such as the adapter assembly of a transceiver 2 (FIG. 1). Alignment ferrules 23 and 24 fit within the through passageways 33 and 34 of active device mounts 35 and 36 of the transceiver adapter assembly 6 to align end face 37 of optical fiber 11 with optical detector end 38 of the optical transmitter 2 and to align end face 39 of optical fiber 11 with optical emitter end 40 of the optical receiver 3. The alignment fixture 12 is secured within the transceiver adapter assembly 6 by biased spring fit of latch 41 and latch 42 against the inner walls of the assembly 6.

Figure 4A:
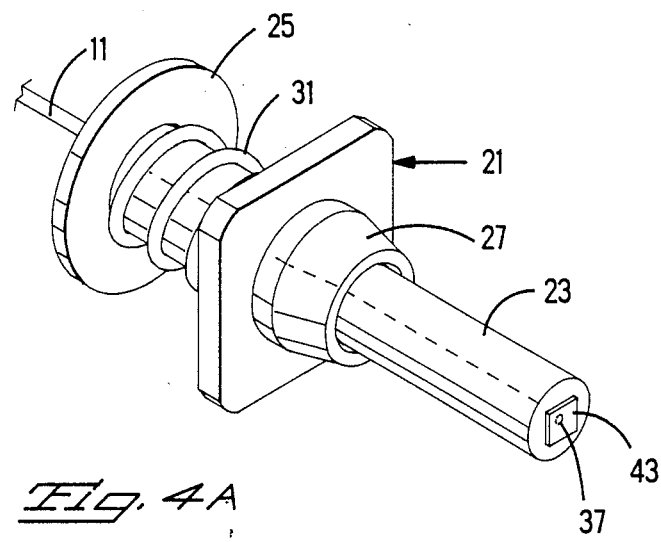
FIG. 4A is a perspective view of the preferred embodiment of the optical filter and end face of the optical fiber of the loop-back attenuator of the present invention and FIG. 4B is a fragmentary cross-sectional view of the end of the optical fiber and filter of FIG. 4A.
Figure 4B:
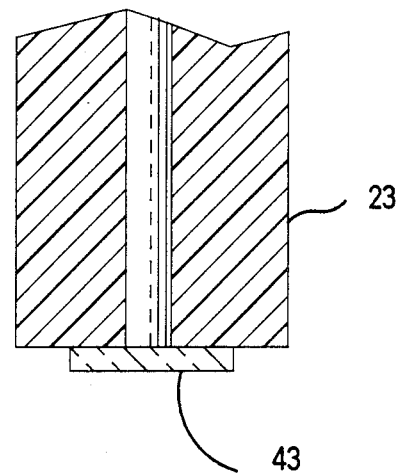

Referring to FIGS. 4A and 4B, is shown one embodiment of the present invention whereby the detector end face 37 of optical fiber 11 has been modified with a square of filter glass 43 to thereby modify the optical power transmitting capabilities of the optical fiber 11. Thereby, the optical power in optical fiber 11 is attenuated in accord with the present invention. The filter 43 is a commercially available attenuator filter such as may be obtained from Schott Glass Technologies, Inc., 400 York Avenue, Duryea, Pa., 18642 or Interoptics Ottawa, Ontario, Canada. Other forms of optical attenuation such as glass or plastic filters may be used. The filter 43 must be thin enough to avoid significant beam dispersion. Additionally, other shapes other than the square shown in FIGS. 4A and 4B may be used, such as a disc, so long as the total thickness is not so great as to cause significant beam dispersion. Generally, it is preferred to utilize an infra-red radiation absorption filter which has a uniform absorption through a desired range of wavelengths. Although an aselective filter is preferred, as opposed to a filter which selectively transmits particular light wavelengths, other filters such as bandpass filters, including long-pass and short-pass filters, may be usable where appropriate.

Suitable filters are manufactured and supplied in various thicknesses, which serve to provide a number of filter effects, but generally the filter must be thin, preferably within the range of 0.1 millimeter to 0.5 millimeter. Generally, it is desirable to keep the thickness of the filter within the range of 0.4 millimeter or less. The combining of suitable filters results in additional variations and control of optical power transmitted to the detector.

In order to simulate the operation of optical communication systems, most applications require, and most manufacturers specify simulators, which will provide an attenuation in the range of from 12 dB to about 1 dB. Preferably, and for the great majority of applications, the attenuation provided by the present invention for a given wavelength will range between 3 and 10 dB.

EXAMPLE

A loop-back attenuator 10 is constructed and modified with a filter glass 43 to provide a desired 10 dB loss with an optical fiber 11 of 1.3 m center wavelength. The particular thickness of filter 43 to be utilized is determined by the relationship $T_i = (10^{(-LOSS/10)})/R_c$ where $T_i$ equals the internal transmission of filter 43, $R_c$ is the reflection coefficient of the filter 43 and the LOSS is the desired loss in dB's which has been specified at 10 dB. The filter 43 to be used is a 1.3 m center wavelength optical power filter specified as SCHOTT KG5 from Schott Glass Technologies, Inc., 400 York Avenue, Duryea, Pa., 18642. Referring to the SCHOTT Filter Glass catalog, the $R_c$ reflection coefficient of the SCHOTT KG5 filter is 0.92. By the relationship above, $T_i$ is calculated at 0.108 or 10.8% internal transmission for the target 10.0 dB loss. Referring to the transmission curves as provided in the SCHOTT Filter Glass catalog, the desired filter thickness for the KG5 filter glass of 1.3 m center wavelength optical powers is determined to be 0.4 mm.

The simulator 10 utilizing the loop-back optical fiber 11 is constructed by utilizing FSD ceramic connectors 21 and 22 with 2.5 mm diameter ferrules 23 and 24. A square filter 43, 0.050 by 0.050 inches and of the thickness as determined above, is attached to the end face of the optical fiber 11 at the receiver, i.e., detector side 37. Experimental results indicate that using the filter on the receiver side provides consistent repeatability with the connection. The filter 43 is attached to the receiver side ferrule 23 using an epoxy that is transparent at the center wavelength of 1.3 m. For this application, an epoxy identified as TRACON Bipax TRA-BOND BA-F113 AMP which is transparent in the near infrared is used as the adhesive. A small droplet of the epoxy is applied to receiver ferrule 24 end face. A stripped optical fiber is used for applying the epoxy droplet at this point. The filter piece 43 is placed on the receiver ferrule 23 end face with tweezers. The connector 21 is then heated for two hours at 65 Celsius to cure the epoxy attaching the filter 43. Thereafter, the simulator 10 is closed by attaching the top upper cover 13 by snapping it into connection with the molded lower cover 14 containing the loop-back 11.

To determine the loss, an attenuator 10 constructed with a 62.5/125 m fiber 11 without attached filter 43 is connected to the optical receiver 3 to give a reference reading from the detector 5. Thereafter, the simulator 10 utilizing the loop-back attenuator with filter 43, as constructed as described, is connected and a reading taken at the receiver side. LOSS is determined by the relationship: $LOSS = -10\log(P_o/P_i)$ where $P_o$ is the signal from the detector 5 using the filtered loop-back and $P_i$ is the signal from the detector 5 utilizing the reference loopback. Three readings are taken using the constructed simulator of the present invention and the values determined range from 10.0 to 10.3 dB's.

Because the invention can take numerous forms, it should be understood that the invention is limited only insofar as is required by the scope of the following claims.

We claim:

1. An optical simulator shaped to be interchangeable with a complementary connector that intermates with an optical connector having an optical emitter and an optical detector, the optical simulator comprising; an alignment fixture with connectors for intermating with the optical emitter and the optical detector, and an optical fiber formed in a loop and installed within the alignment fixture with a first end face of the loop aligned, through a corresponding alignment fixture connector, with the emitter, and a second end face of the loop aligned, through a corresponding alignment fixture, with the detector of the optical connector;

the optical fiber being formed in a loop further having an optical filter attached to an end face of the fiber to provide controlled attenuation of optical power to the optical detector.

2. The optical simulator of claim 1 wherein the optical filter is characterized by an internal transmission, $T_i$, determined by the relationship:

$$T_i=(10-^{(LOSS/10)})/R_c$$

where LOSS is the target loss value in dBs and $R_c$ is the relection coefficient of the filter.

3. The optical simulator of claim 1 wherein the optical filter results in attenuation of optical power to the optical detector in the range of between 3 dB and 7 dB.

4. The optical simulator of claim 1 wherein the optical filter results in attenuation of optical power to the optical detector in the range of between 12 dB and 1 dB.

5. The optical simulator of claim 1 wherein the filter is an infra-red radiation absorption filter.

6. The optical simulator of claim 1 wherein the optical filter comprises a neutral density filter.

7. The optical simulator of claim 1 wherein the filter is an aselective filter.

8. The optical simulator of claim 1 wherein the filter is in the shape of a square.

9. The optical simulator of claim 1 wherein the filter is in the shape of a disc.

10. The optical simulator of claim 1 wherein the filter is a glass filter.

11. The optical simulator of claim 1 wherein the optical connector is the adapter assembly of a transceiver.

12. The optical simulator of claim 1 wherein the simulator is a plug-compatible shape for disconnect coupling to the optical connector to a transceiver.

13. The optical simulator of claim 1 wherein the simulator comprises an alignment fixture encompassing the optical fiber in the form of a loop.

14. The optical simulator of claim 1 wherein the alignment fixture comprises an upper cover with an extension section with outwardly directed threads and a lower cover with extension section with outwardly directed threads.

15. The optical simulator of claim 14 wherein the upper cover and lower covers are attached by snap-in connection and secured by a threaded cup interthreaded with the threads of the unitary extension section formed by the complementary fitting of the extension section of the upper cover and the extension section of the lower section.

* * * * *